H. J. GERNER.
CONTINUOUS ICE CREAM FREEZER.
APPLICATION FILED JUNE 12, 1907. RENEWED FEB. 10, 1909.
935,490.
Patented Sept. 28, 1909.
5 SHEETS—SHEET 1.
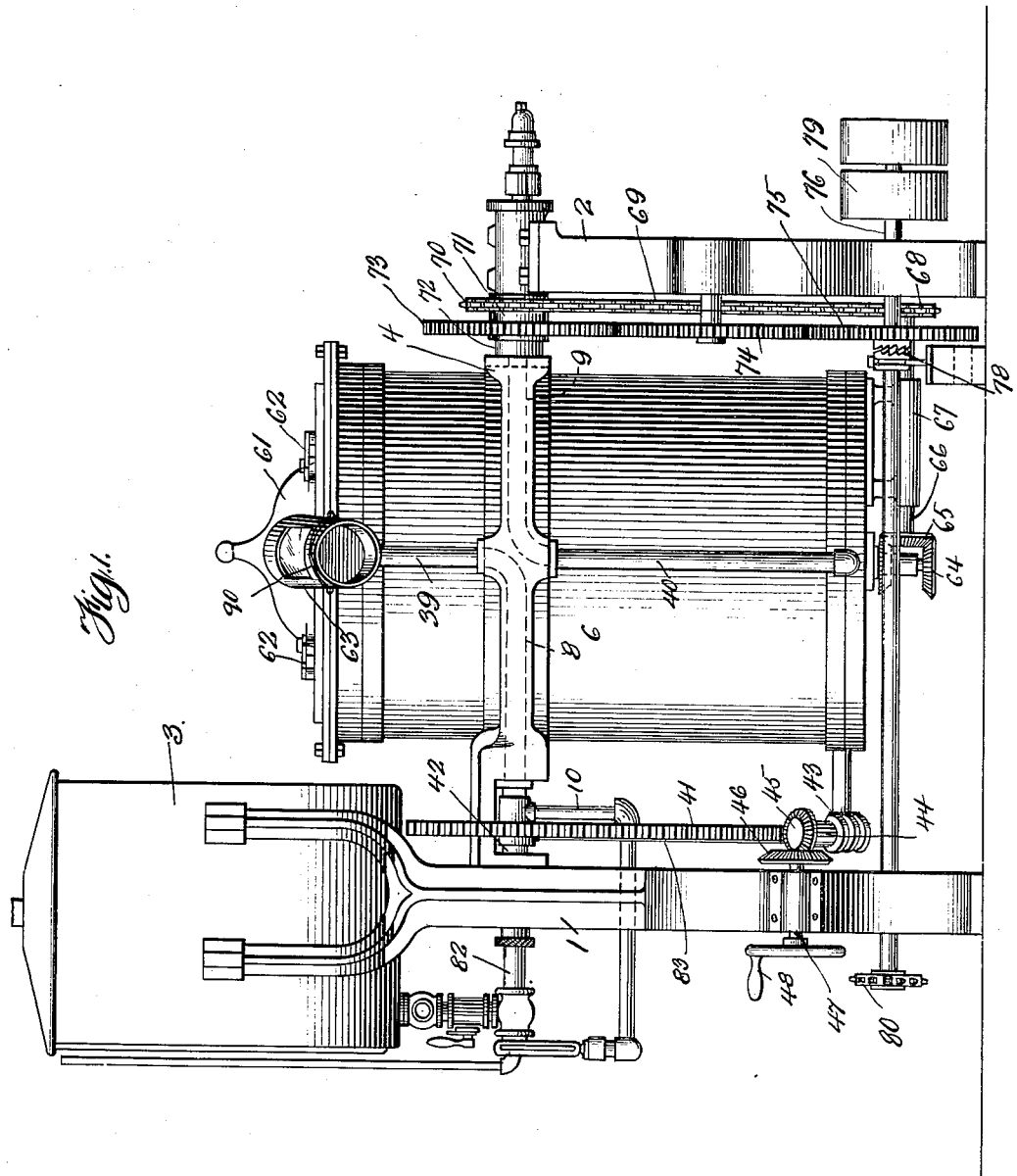
WITNESSES:
Samuel Payne
K. H. Rutler
INVENTOR
H. J. Gerner.
By H. C. Evert & Co.
Attorneys

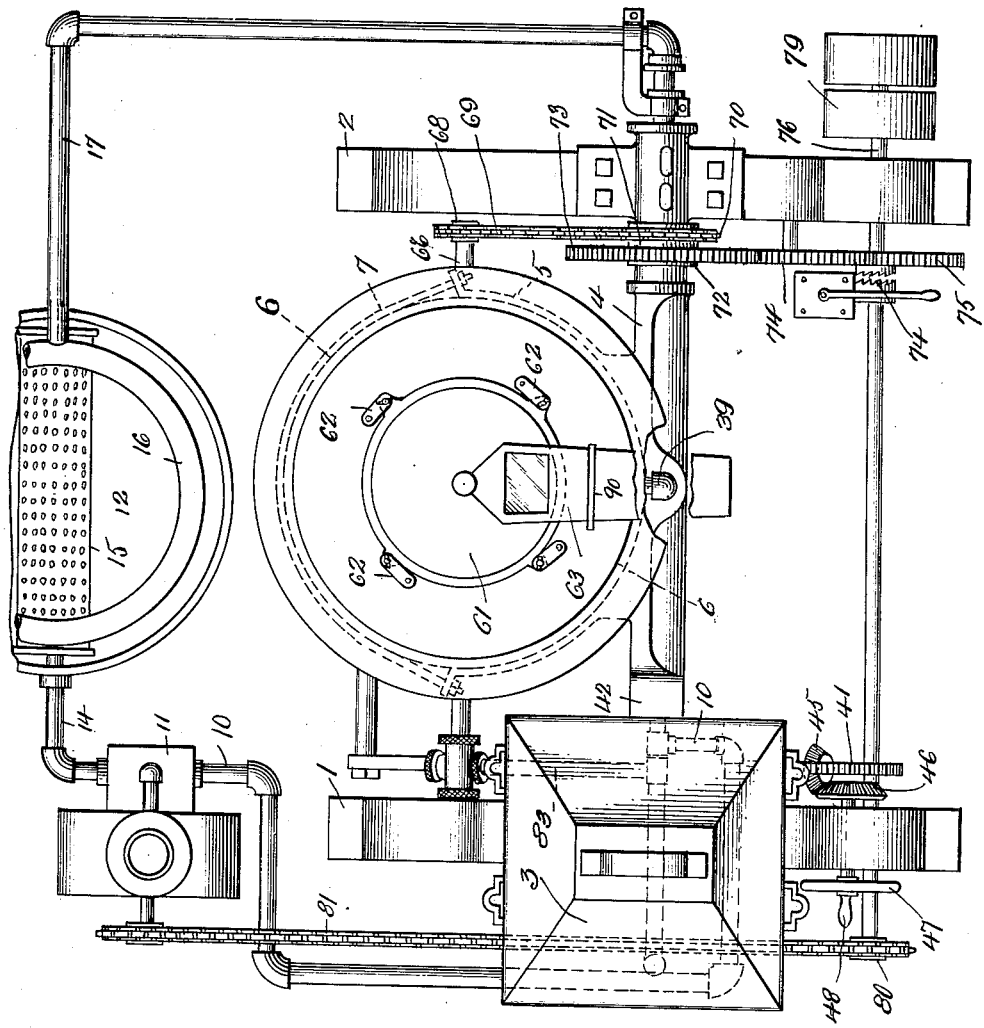

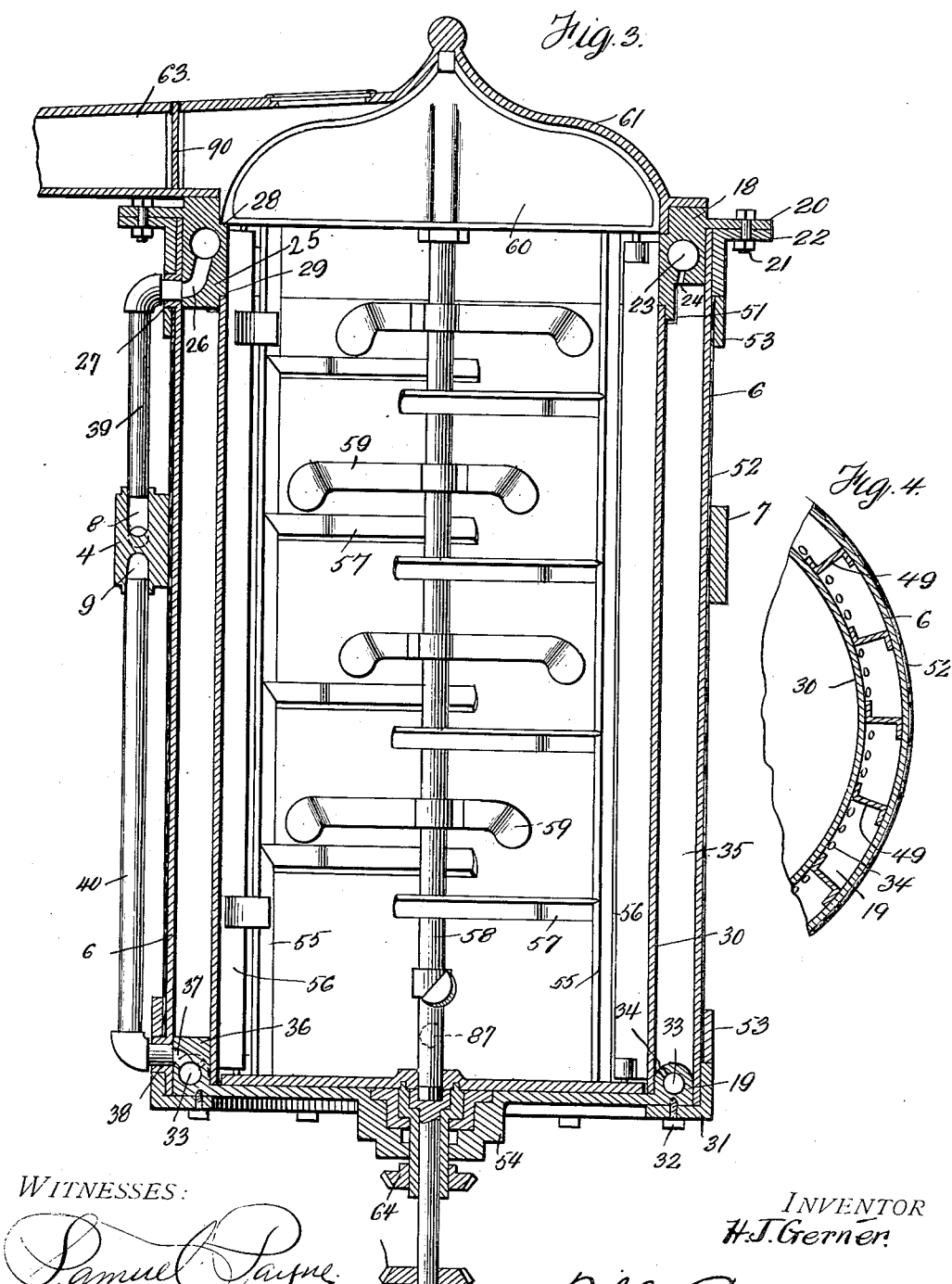

H. J. GERNER.
CONTINUOUS ICE CREAM FREEZER.
APPLICATION FILED JUNE 12, 1907. RENEWED FEB. 10, 1909.
935,490.
Patented Sept. 28, 1909.
5 SHEETS—SHEET 4.
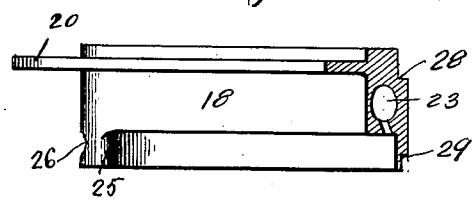
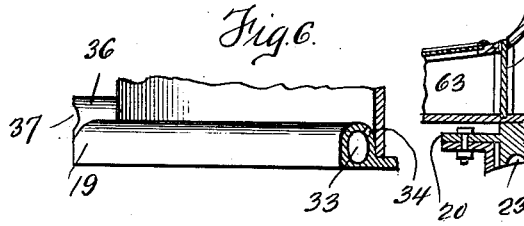
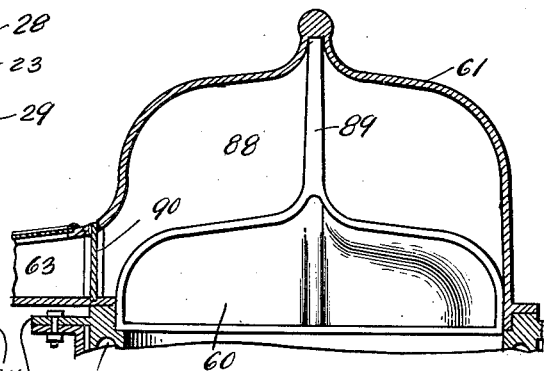
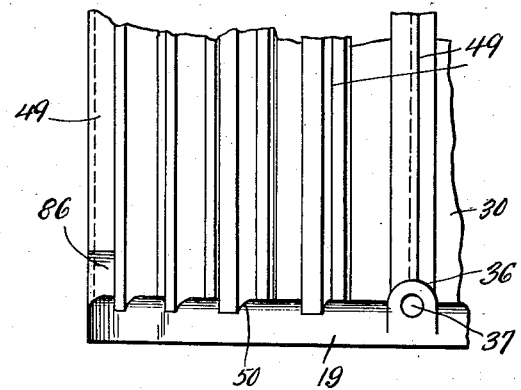
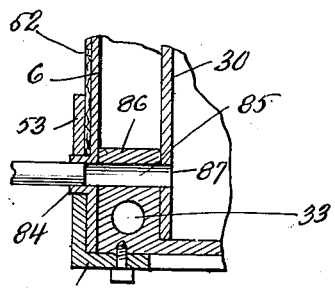
WITNESSES:
INVENTOR
H. J. Gerner.
BY
Attorneys H. J. GERNER.
CONTINUOUS ICE CREAM FREEZER.
APPLICATION FILED JUNE 12, 1907. RENEWED FEB. 10, 1909.

935,490.

Patented Sept. 28, 1909.

5 SHEETS—SHEET 5.

Fig. 10.

Witnesses
Samuel Payne
L. H. Butler

Inventor
H. J. Gerner.
By H. C. Evert
Attorneys

UNITED STATES PATENT OFFICE.

HENRY J. GERNER, OF CANTON, OHIO, ASSIGNOR TO MARY GERNER, OF CANTON, OHIO.

CONTINUOUS ICE-CREAM FREEZER.

935,490.  Specification of Letters Patent.  Patented Sept. 28, 1909.

Application filed June 12, 1907, Serial No. 378,509.  Renewed February 10, 1909.  Serial No. 477,217.

*To all whom it may concern:*

Be it known that I, HENRY J. GERNER, a citizen of the United States of America, residing at Canton, in the county of Stark and State of Ohio, have invented certain new and useful Improvements in Continuous Ice-Cream Freezers, of which the following is a specification, reference being had therein to the accompanying drawing.

This invention relates to improvements in ice cream freezers and machines, of that type wherein cream is continuously and simultaneously agitated and subjected to a frigid temperature, whereby the cream will be frozen continuously during the operation of the freezer or machine.

The invention relates more particularly to improvements in the type of freezers illustrated and described in prior patents granted to me July 9th, 1907, No. 859,876; Aug. 20th, 1907, No. 863,980; and Aug. 20th, 1907, No. 864,091.

In order that those not conversant with the above type of freezers may fully understand the present invention, a brief resumé of one of the freezers is as follows: The freezer consists of standards having a tub trunnioned therebetween. In the tub is located a can having a double acting dasher located therein. A freezing agent is continuously admitted to the tub, through one of the trunnions, circulated around the can, and discharged through the other of said trunnions. A cream reservoir is located on one of the standards for feeding cream to the can within the tub near the bottom of said can, and as the cream gradually freezes, it rises to the top of the can and is ejected through a suitable spout. Novel means is employed for tilting the tub and its contents, and for controlling the admission of cream to the can, and assuring the circulation of the freezing agent.

The present invention aims to provide trunnions of a novel design, which serve functionally for supporting the tub and conveying the refrigeratory agent to the front of the tub, dispensing with the cumbersome arrangement of pipes heretofore used.

Another object of the present invention is to dispense with the use of a wooden tub and provide a novel receptacle for supporting the freezing can. In using the receptacle, I provide novel means for equally distributing and withdrawing the freezing agent from the receptacle, and also provide novel means in connection with the freezing can for insuring an equal distribution of the freezing agent, irrespective of the position or inclination of the receptacle.

The detail construction entering into my invention will be presently described and then specifically pointed out in the appended claims:

In the drawing, Figure 1 is a front elevation of the freezer or machine. Fig. 2 is a plan of the same. Fig. 3 is a vertical sectional view of the freezer can receptacle and can. Fig. 4 is a horizontal sectional view of a portion of the same. Fig. 5 is an elevation of a portion of the upper head of the freezer, can receptacle and can. Fig. 6 is a similar view of the lower head. Fig. 7 is an elevation of a portion of the freezer can. Fig. 8 is a detailed sectional view of a modified form of the cap or cover of the freezer can, and Fig. 9 is a detailed sectional view of a portion of the freezer. Fig. 10 is an end elevation of an ice cream freezer constructed in accordance with my invention.

The freezer or machine consists of uprights or stands 1 and 2, the stand 1 supporting a cream receptacle or reservoir 3.

Trunnioned in the stands 1 and 2 is a carrier 4, having a semi-cylindrical band 5 to which is connected a receptacle 6, a strap 7 embracing said receptacle and connecting with the ends of the band 5. The carrier 4 is formed with two passages 8 and 9, the passage 8 extending from the left hand side of the carrier and terminating centrally of the top thereof, while the passage 9 extends from the right hand side of the carrier and terminates centrally of the bottom of said carrier.

Connecting with the passage 8 is a pipe 10 leading to a pump 11, which connects with a brine tub 12 by a pipe 14. In the bottom of the brine tub 12 is located a perforated cylinder 15 connecting with the pipe 14, while in the top of the tub is located a perforated tubular ring 16 connecting with the pipe 17 that extends through the trunnion of the carrier 4 and connects with the passage 9. The brine tub 12 forms a subject matter of a companion application.

The receptacle 6 is preferably constructed of metal, and is provided at the upper end with an annular closure or head 18, and at the lower end with an annular closure or head 19, the latter constituting the bottom of the receptacle. The head 18 is provided with an annular flange 20 and connecting with said flange by bolts and nuts 21 is a band 22, preferably of angle-iron which surrounds the upper edge of the receptacle and is soldered or suitably secured thereto. The annular closure or head 18 is formed with a circumferentially arranged bore 23 and with a plurality of circumferentially arranged openings 24. The closure or head 18 is also formed with an enlargement 25, having a passage 26 formed therein communicating with the bore 23 and a nipple 27, carried by the receptacle 6. The closure or head 18 has its upper and lower inner edges recessed, as at 28 and 29, the object of which will presently appear.

The lower closure or head 19 forming the bottom of the receptacle 6 provides a seat for a freezer can 30, the lower end of the can snugly fitting in the closure or head 19, while the upper end engages in the annular recess 29 of the closure or head 18. The closure or head 19 is retained in engagement with the receptacle 6 and the can 30 by an annular angle iron 31 soldered or otherwise secured to the lower end of the receptacle 6, said angle iron being secured to the closure or head by screw bolts 32. In the closure or head 19 is formed a bore 33 similar to the bore 23, and a plurality of openings 34 are formed in the said head 19 to establish communication between the bore 33 and the space 35 between the can 30 and the receptacle 6. The openings 24 of the closure or head 18 also serve to establish communication between the bore 23 and the space 35. The closure or head 19 is provided with an enlargement 36 having a passage 37 formed therein, establishing communication between the bore 33 and a nipple 38 carried by the receptacle 6. The closures or heads 18 and 19 are arranged in the receptacle 6 whereby the enlargements 25 and 36 of said closures or heads will vertically aline, permitting of a pipe 39 connecting with the nipple 27 and the pasage 8 of the carrier 4, and a pipe 40 connecting with the nipple 38 and the passage 9 of the carrier 4. It will thus be observed that a circulating system is provided for the brine or freezing agent contained within the tub 12. When the pump 11 is placed in operation, the brine is removed from the bottom of the tub 12 and forced through the pipe 10, passage 8, pipe 39 to the bore 23 of the closure or head 18, from where the brine passes through the openings 24 into the space 35 between the can 30 and the receptacle 6. The brine passing through the openings 34 enters the bore 33 and is removed by the pipe 40, passage 9, pipe 17 and the perforated tubular ring 16 of the tub 12, the brine being sprinkled over the ice contained within the tub.

In Figs. 1, 2 and 10, of the drawings I have illustrated a segment rack 41 for tilting the receptacle 6 and its contents, said rack being carried by the trunnion 42 of the carrier 4 and meshing with a worm 43, carried by the lower end of a shaft 44 journaled at one side of the stand 1. The shaft 44 carries a beveled gear wheel 45 meshing with a similar wheel 46, carried by the end of a shaft 47 journaled upon the stand 1, the outer end of the shaft 47 being provided with a crank wheel 48, whereby the receptacle 6 can be tilted through the medium of the mechanism just described.

Now to prevent the brine from flowing around the freezer can 30, when the receptacle 6 is tilted, I provide the freezer can 30 with vertical ribs 49 substantially Z-shape in cross section, said ribs being soldered or otherwise secured to the periphery of the freezer can. The ribs 49 are equally spaced around the freezer can 30, and have their ends cut away, as at 50 and 51, to clear the closures or heads 18 and 19. It will thus be observed that irrespective of the position of the receptacle 6, the brine will be carried over the entire surface of the freezer can 30.

Since the brine circulating between the freezer can 30 and the receptacle 6 will have a tendency to frost the metallic receptacle 6, I cover the latter with asbestos 52 or a similar insulating material, the asbestos being retained upon the receptacle 6 by the bands 5, strap 7 and metallic bands 53 arranged at the top and bottom of the receptacle 6. The asbestos also serves to prevent the atmospheric conditions of the compartment in which the machine is operated from affecting the temperature of the freezer can 30 and the brine passing over said can.

The closure or head 19 is provided with a central depending enlargement 54, providing a bearing for a dasher frame 55 having scrapers 56 and agitating arms 57, and for a dasher 58 having agitating arms 59. The upper end of the dasher 58 is journaled in a head 60 carried by the dasher frame 55, said head bearing in a lid or cover 61 seating in the recess 28 of the closure or head 18, said lid or cover being detachably held by clamps 62. A spout or chute 63 is carried by the lid or cover 61, to permit of the cream frozen within the can 30 passing from the machine.

The dasher frame 55 and the dasher 58 are revolved in opposite directions through the medium of beveled gear wheels 64 meshing with the beveled gear wheel 65, carried by a shaft 66 journaled in a bearing 67 and secured to the closure or head 19. The opposite end of the shaft 66 is provided with a sprocket wheel 68 over which passes a sprocket chain 69, said chain also fastened over a sprocket wheel 70 mounted upon a sleeve 71, which is journaled upon the trunnion 72 of the carrier 4. The sleeve 71 is provided with a spur wheel 73, meshing with a spur wheel 74, journaled upon the side of the stand 2. The spur wheel 74 meshes with a similar wheel 75 loosely mounted upon a shaft 76 journaled in the stands 1 and 2. The shaft 76 is provided with a conventional form of clutch mechanism 78 for controlling the rotation of the spur wheel 75, and consequently the operation of the dasher frame 55 and the dasher 58. The shaft 76 is provided with pulley wheels 79, whereby said shaft can be operated from a suitable source of power. The shaft is also provided with a sprocket wheel 80 for driving the pump 11 through the medium of a sprocket chain 81.

Cream is admitted to the freezer can 30 from the receptacle or reservoir 3 by a pipe 82 extending through the trunnion 42 of the carrier 4, through a pipe 83 tapping into a nipple 84, carried by the receptacle 6, the nipple 84 connecting with an opening 85 formed in an enlargement 86 carried by the closure or head 19. The opening 85 alines with an opening 87 formed in the freezer can 30.

In Fig. 8 of the drawings, I have illustrated a slight modification of the lid or cover 61, wherein the lid or cover conforms to a dome having a storage space 88 communicating with the spout or chute 63. The head 60 is provided with an extension 89 whereby the head can be journaled in the top of the cover or lid 61. A gate 90 is used in connection with the spout or chute 63, whereby the delivery of cream can be shut off, while an empty receptacle is being substituted for one filled with cream. During this exchange of receptacles the frozen cream can store in the space 88 of the lid or cover 61.

In comparing the present invention with my prior inventions, it will be observed that the improvement consists principally in the construction of the carrier 4 and the receptacle acting as a tub, and the contents carried thereby. In dispensing with the ordinary wooden tub, as heretofore used, I facilitate the operation of connecting metallic parts to the tub and entirely eliminate the use of wood which is susceptible to expansion and contraction to such a degree as to cause considerable trouble in setting up the freezer. The novel construction of the receptacle and its appurtenant parts permits of the closures or heads, receptacle, and can being easily and quickly assembled, insuring a durable structure and reducing the cost of manufacture.

I desire to call particular attention to the novel construction of the freezer can receptacle and can, as they practically consist of two cylindrical shells connected by closures or heads, which serve functionally for holding the shells or cylinders in position and permitting of a refrigeratory agent circulating between said shells or cylinders.

What I claim is:—

1. In a freezer, the combination with stands, of a receptacle, alining hollow receptacle supporting trunnions mounted upon said stands and disposed tangentially to said receptacle, closures carried by said receptacle communicating with said hollow trunnions, said closures having passages formed therein, and having a plurality of circumferentially arranged openings leading from said passages to the space within the receptacle, a stationary can mounted in said closures, vertically disposed ribs arranged around said can, a reservoir carried by one of said stands and having a pipe connecting with one of said closures and communicating with said can, a brine supply pipe connecting with one of said trunnions, a brine outlet pipe connecting with the other of said trunnions, means for agitating the contents of said can, and means for moving said receptacle and can from a vertical to a horizontal position.

2. In an ice-cream freezer, the combination with stands, of a receptacle, a hollow carrier trunnioned in said stands and disposed tangentially to said receptacle and supporting said receptacle, hollow closures or heads for said receptacle, a stationary can carried by said receptacle and providing an annular space between said can and said receptacle, ribs carried by said can, brine pipes connecting the said hollow closures of said receptacle with said hollow carrier, a reservoir carried by one of said stands and communicating with said can, means to agitate the contents of said can, and means carried by one of said stands and connecting with said receptacle for tilting the same.

3. In an ice cream freezer, a brine receptacle, a freezer can mounted stationary within the brine receptacle, and hollow closures for the ends of the space between the brine receptacle and the freezer can and provided with openings establishing communication between the hollow closures and the said space.

4. In an ice cream freezer, a brine receptacle, a freezer can mounted stationary within the receptacle, hollow brine-receiving heads closing the ends of the space between the brine receptacle and freezer can, and means exterior of the brine receptacle establishing communication between said heads.

5. In an ice cream freezer, a brine receptacle, and a hollow annular closure or head for each end of said receptacle, the said heads having openings communicating with the receptacle and each having a passage leading to the exterior of the brine receptacle.

6. In an ice cream freezer, a suitable support, a carrier trunnioned to swing in said support and provided with an inlet and an outlet passage, a brine receptacle supported by said carrier, a freezer can mounted in said brine receptacle, hollow closures or heads closing the ends of the space between the brine receptacle and the freezer can and having openings communicating with said space, each of said heads having a passage leading to the exterior of the receptacle, a pipe exterior of the brine receptacle establishing communication between one of said passages and one of the passages in the carrier, and a pipe establishing communication between the passage in the other head and the other passage in said carrier.

7. In an ice cream freezer, a brine receptacle, a freezer can mounted therein, hollow heads closing the ends of the space between the can and the receptacle, each head provided with ports communicating with the space between the can and the brine receptacle, an inlet port in one of said heads leading to the exterior of the brine receptacle, an outlet port in the other of said heads leading to the exterior of said brine receptacle, an inlet pipe connected to said inlet port, and an outlet pipe connected to said outlet port.

8. In an ice cream freezer, a brine receptacle, a freezer can mounted therein and spaced therefrom, heads closing the ends of the space between the can and brine receptacle, said heads each provided with passages for the circulation of the brine and having openings communicating with the space between the can and brine receptacle, one of said heads having an inlet port and the other having an outlet port.

9. In an ice cream freezer, a brine receptacle, a freezer can mounted therein and spaced therefrom, hollow heads closing the ends of the space between the freezer can and the brine receptacle and having openings communicating with said space, a brine supply connected to one of said heads and a brine outlet connected to the other head.

10. In an ice cream freezer, a brine receptacle, a can mounted therein and spaced therefrom, closures for the ends of the space between the can and receptacle each having a passage communicating with the space between the can and brine receptacle and forming a part of the brine circulating system of said receptacle, a supply connected with one of said closures, and an outlet connected to the other closure.

11. In an ice cream freezer, a brine receptacle, a freezer can mounted therein and spaced therefrom, and a brine circulating system for said receptacle including closures for the ends of the space between the receptacle and can, the brine being received into one of said closures and discharged therefrom to said space between the can and the tub and discharged from said space into the other of said closures.

12. In combination in an ice cream freezer, a brine receptacle, and a closure head for each end of the brine receptacle, each closure head comprising a hollow annular member provided with openings leading from the chamber in said member.

13. In an ice cream freezer, a brine receptacle, a freezer can mounted therein and spaced therefrom, and longitudinally extending partitions substantially Z-shaped in cross section arranged between the can and receptacle and separating the space therebetween into a plurality of compartments.

14. In an ice cream freezer, a brine receptacle, a freezer can mounted stationary therein and spaced therefrom, and a series of partitions extending longitudinally of the receptacle and can within the space between said receptacle and can and extending the full width of said space, said partitions being substantially Z-shaped in cross section having one longitudinal flange secured to the can and the other longitudinal edge secured to the inner wall of the receptacle and separating said space into a plurality of compartments.

15. In an ice cream freezer, a brine receptacle, a freezer can mounted stationary therein and spaced therefrom, longitudinally-extending partitions between the can and receptacle extending the full width of the space between the receptacle and the can and separating said space into a plurality of compartments, the said partitions having longitudinally flanged edges abutting respectively with the receptacle and the freezer can, and an insulating covering secured to the exterior of said receptacle.

16. In an ice cream freezer, a freezer can, a dasher-frame in said can, a dasher carried by said frame, a head for said dasher, and a cover inclosing said head and provided with a discharge spout, said cover spaced away from the head so as to provide a chamber between the cover and dasher head.

17. In an ice cream freezer, a freezer can, a dasher within said can, a head for said dasher, and a cover inclosing the head and spaced away therefrom to provide a chamber between the cover and head.

18. In an ice cream freezer, the combination with stands, of a hollow-carrier trunnioned in said stands, a receptacle carried by said hollow-carrier at one side of the axis of the receptacle, a freezer can mounted stationary within the receptacle and spaced therefrom, hollow closures arranged in the ends of the receptacle, and means including the hollow-carrier and the closures for circulating a refrigeratory agent around said can.

19. In an ice cream freezer, the combination with a receptacle, and a freezer can mounted stationary within the receptacle and spaced therefrom, of a hollow-closure for each end of the space between the receptacle and the can, said hollow-closures constituting part of a brine circulation circuit.

20. In an ice cream freezer, stands, a hollow-carrier trunnioned in said stands, a receptacle supported by said carrier at one side of the axis of said receptacle, hollow-closures arranged in the ends of said receptacle, and a freezer can supported within the receptacle by said hollow-closures.

21. In an ice cream freezer, stands, a hollow-carrier trunnioned in said stands, a receptacle supported by said hollow-carrier at one side of the axis of said receptacle, a freezer can within said receptacle, and means including hollow-closures at the ends of the space between the can and the receptacle for circulating a refrigeratory agent around said can.

22. In an ice cream freezer, stands, a hollow-carrier trunnioned in said stands, a receptacle supported by said carrier at one side of the axis of said receptacle, hollow-closures arranged in the ends of said receptacle, and a freezer can supported within said receptacle by said hollow-closures.

23. In an ice-cream freezer, stands, a metallic receptacle trunnioned in said stands, a freezer can located within said receptacle, and means including a hollow closure for each end of the receptacle for circulating a refrigeratory agent between said receptacle and can irrespective of the position of said receptacle.

24. In an ice cream freezer, stands, a hollow-carrier trunnioned in said stands, a receptacle supported by said carrier, a can located in said receptacle, ribs carried by said can, and means including a hollow-closure for each end of the receptacle for circulating a refrigeratory agent between said ribs within said receptacle.

25. In an ice cream freezer, a receptacle, a freezer can mounted in said receptacle, hollow-closures mounted in the ends of said receptacle supporting said can and having communication with the space between the can and the receptacle, and vertically disposed ribs arranged in the space between the can and receptacle and extending from the hollow-closure at one end of the receptacle to the hollow-closure at the other end thereof.

26. In an ice cream freezer, a receptacle, hollow-closures for said receptacle, a freezing can supported by said hollow closures within said receptacle and separated from the receptacle to provide an annular space between the can and the receptacle, and means including said hollow closures for circulating a refrigeratory agent within said annular space.

27. In an ice cream freezer, a receptacle, a freezer can within said receptacle, hollow closures for the ends of the receptacle having communication with the space between the can and the receptacle, and vertically disposed ribs carried by said can for dividing the space between the can and the receptacle into a plurality of spaces.

28. In an ice cream freezer, two shells, arranged one within the other, vertically disposed ribs interposed between said shells dividing the chamber therebetween into a plurality of independent spaces, and hollow closures connecting the shells and having communication with said spaces.

29. In an ice cream freezer, shells, hollow-closures connecting the shells at each end, ribs arranged between said shells, and means including the hollow-closures for circulating a refrigeratory agent between the shells.

30. In an ice cream freezer, metallic shells arranged one within the other, hollow-closures connecting said shells at each end and having communication with the space between the shells, and ribs arranged between the shells.

In testimony whereof I affix my signature in the presence of two witnesses.

HENRY J. GERNER.

Witnesses:
 MAX H. SROLOVITZ,
 K. H. BUTLER.